United States Patent [19]

Hallidy

[11] 4,338,536

[45] Jul. 6, 1982

[54] REVERSIBLE DIRECT CURRENT MACHINE WITH MOVABLE STATOR

[76] Inventor: William M. Hallidy, 620 E. Laurel Ave., Glendora, Calif. 91740

[21] Appl. No.: 77,324

[22] Filed: Sep. 20, 1979

[51] Int. Cl.³ .......................................... H02K 13/00
[52] U.S. Cl. .................................. 310/191; 310/230; 310/241; 318/292; 318/293
[58] Field of Search ............... 310/219, 230, 241, 191, 310/209; 318/292, 293

[56] References Cited

U.S. PATENT DOCUMENTS

| | | | |
|---|---|---|---|
| 1,222,720 | 4/1917 | Bijur | 310/230 X |
| 3,114,852 | 12/1963 | Cook | 310/241 X |
| 3,273,002 | 9/1966 | Easton | 310/191 |
| 3,330,976 | 7/1967 | Brown | 310/191 |
| 3,663,851 | 5/1972 | Persson | 310/291 X |
| 3,800,175 | 3/1974 | Plötscher et al. | 310/191 X |
| 4,110,649 | 8/1978 | Mas | 310/191 |

Primary Examiner—Donovan F. Duggan
Attorney, Agent, or Firm—Fulwider, Patton, Rieber, Lee & Utecht

[57] ABSTRACT

A motor or generator of the direct current type includes a stator carrying permanent magnets that is rotatable between first and second operational positions. A rotor having a winding and cooperating with a commutator is rotatable in either direction. The orientation of the magnetic field with respect to the commutator, as determined by the position of the stator, establishes the direction of rotation. If the stator is off-center when the rotor winding is energized, the stator will move to one of its operational positions under the force of a reaction torque.

14 Claims, 5 Drawing Figures

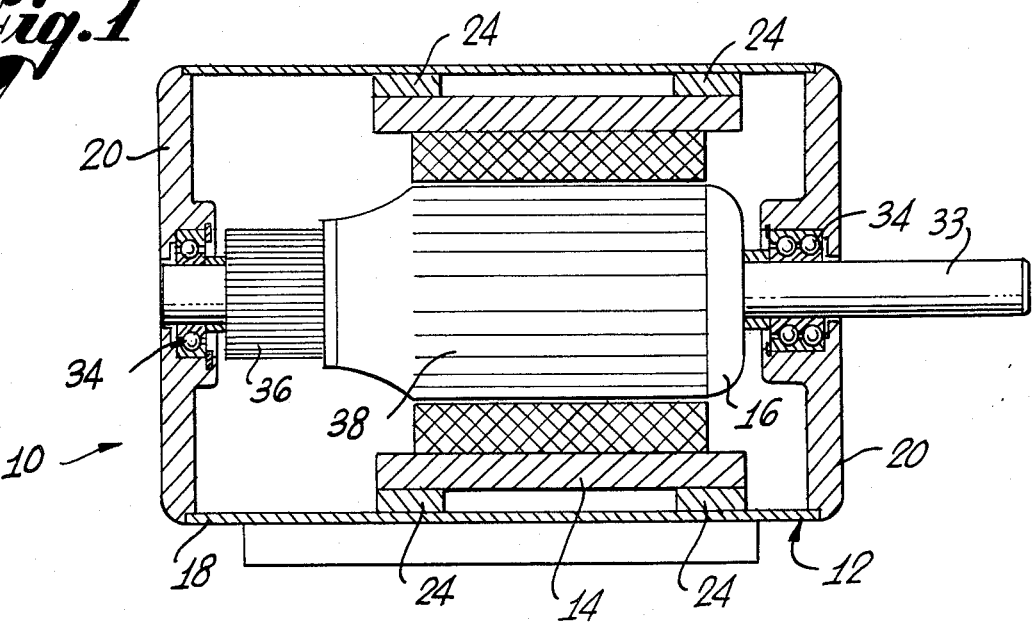
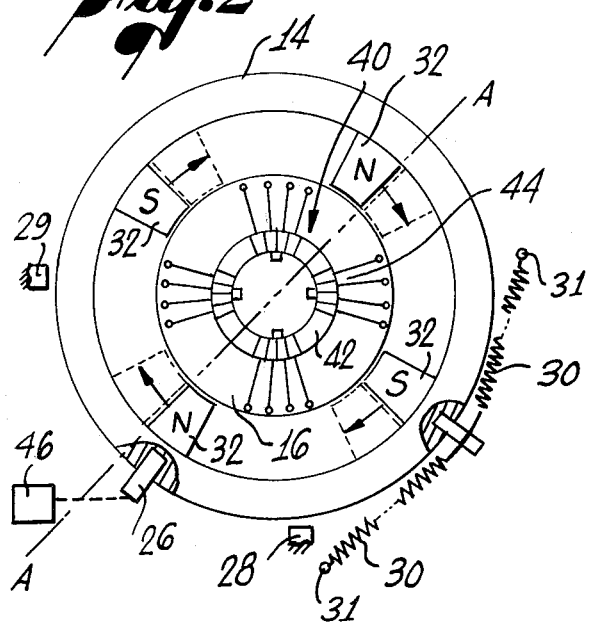 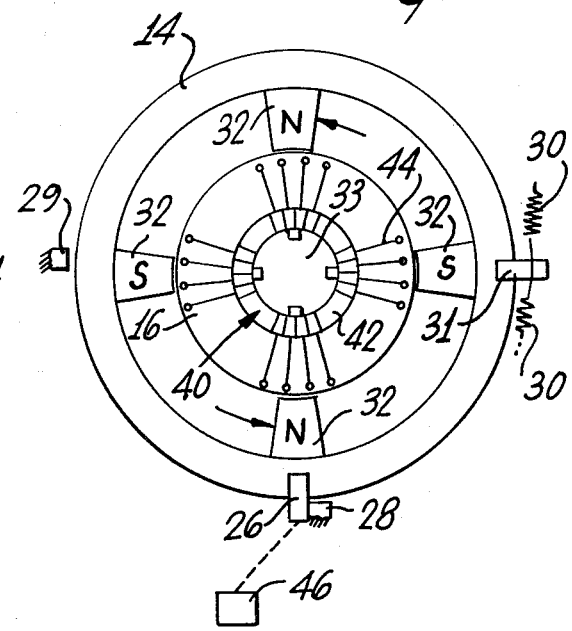

REVERSIBLE DIRECT CURRENT MACHINE WITH MOVABLE STATOR

FIELD OF THE INVENTION

The present invention relates to rotary electromagnetic energy conversion machines, and, more particularly, to reversible direct current motors and generators.

BACKGROUND OF THE INVENTION

In a conventional direct current motor, a permanent magnet mounted on a stator establishes a stationary magnetic field. A rotor that turns within the field carries a segmented electrical winding. As the rotor turns, the winding segments interact with a commutator so that the direction of current flow in each segment is reversed as it reaches a switch-over position. At any given time, the current flow in the various segments is such that the electromotive forces applied to them are cumulative to urge the rotor in a particular rotational direction.

The direction in which the rotor turns is thus determined in accordance with Lenz's law, by (1) the direction of current flow in the winding segments, i.e., the commutator orientation and (2) the direction of the magnetic field. Reversal of the motion of the rotor can be accomplished by switching the electrical connections of the commutator to reverse the current direction corresponding to each winding segment position. This commutator principle is employed in a similar manner in direct current generators.

An objective of the present invention is to provide an improved motor or generator in which the direction of rotation can be reversed without any electrical switching. A further objective is to provide such a motor or generator that is of simple reliable construction with a minimum of movable parts and without a complex magnetic circuit.

SUMMARY OF THE INVENTION

According to the present invention, a motor or generator has a base and a stator that carries a magnet, preferably a permanent magnet. The stator is supported by the base and is rotatable between angularly displaced first and second operational positions. A rotor within the stator cooperates with a commutator that determines the direction of current flow through each segment of a rotor winding.

The relationship between the magnetic field and the commutator orientation can be reversed by moving the stator between its first and second positions. This reversal occurs when the separation between adjacent magnetic pole positions is equal to the angular displacement of the magnet when moving between its first and second operational positions.

In a motor that forms a preferred embodiment of the invention, the stator is biased toward a home position in which it is off-center with respect to its two operational positions. Upon energization of the winding, a reaction torque moves the stator to its closest operational position, corresponding to rotor rotation in a preferred direction. When rotation in the non-preferred direction is desired, the stator is shifted by a solenoid or other means, from the rest position past the central position. The reaction torque will then complete the movement to the desired operational position.

BRIEF DESCRIPTION OF THE DRAWINGS

FIG. 1 is a cross-sectional side view of a motor constructed in accordance with the present invention;

FIG. 2 is a partially schematic end view of the motor of FIG. 1 in its non-operational rest position;

FIG. 3 is a view similar to FIG. 2 showing the motor in a first operational position corresponding to clockwise rotation;

DESCRIPTION OF THE PREFERRED EMBODIMENTS

Figure 4:
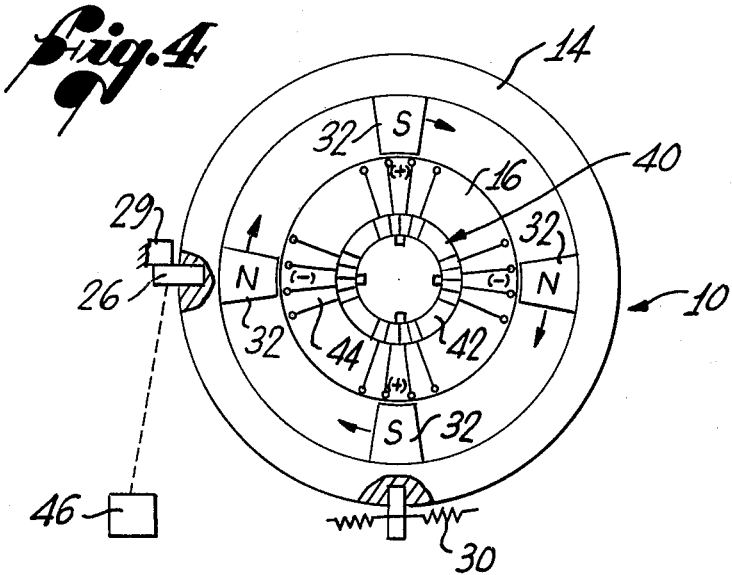
FIG. 4 is another view similar to FIG. 2 showing the motor in a second operational position corresponding to counter-clockwise rotation.

The present invention is embodied in an exemplary direct-current, electric motor 10 shown in FIGS. 1–4. In general, it includes a base or frame 12, a stator 14 mounted within the frame and a rotor 16 within the stator.

The frame 12 has a generally cylindrical side wall 18 capped by two end bells 20. Disposed within the frame 12, the stator 14 is rotatable through a limited angle on a plurality of needle bearings 24, the rotational axis of the stator being the same as that of the rotor 16.

Projecting axially from one end of the stator 14 is a lug 26 (shown in FIGS. 2–4, but not FIG. 1) that is engageable with either of two stops 28 and 29 mounted on the frame 12. The positions of the stops 28 and 29 limit the rotation of the stator 14 to 90 degrees. A pair of springs 30 attached at their outer ends to a portion 31 of the frame 12 bias the stator 14 toward a home position (shown in FIG. 2) in which it engages neither stop 28 or 29.

The stator 14 carries permanent magnets 32 arranged circumferentially so that their north and south poles alternate in sequence (only the poles of the magnets being shown in the drawings). Thus, the position of the stator 14 establishes the orientation of a permanent magnetic field.

The rotor 16 is mounted on a shaft 33 rotatably journaled in a pair of bearings 34 that are centered in the end bells 20. An output gear 36 is carried on the shaft 33 between one end of the rotor 16 and an end bell 20 when it is accessible through an opening (not shown) in the side wall 18 or the end bell 20 of the frame 12.

The rotor 16 includes a segmented electrical winding 38 that cooperates in the conventional manner with a commutator 40 having a ring 42 and brushes 44. As the rotor 16 turns, the direction of current flow in each winding segment changes in accordance with its position relative to the commutator 40. Therefore, each segment has the proper current direction, in accordance with Lenz's law, in relation to its direction of movement through the magnetic field. It will be understood that while this preferred motor 10 uses four magnetic poles and a corresponding commutator construction 40, any desired number of poles may be employed, depending on requirements of a particular motor.

One mode of operation of the motor 10 is shown in FIG. 3, with the stator in a position in which the lug 26 contacts the first stop 28. The orientation of the magnetic field of the stator 16 with respect to the fixed orientation of the commutator 40 is such that the rotation of the rotor is clockwise in accordance with Lenz's law.

In a second mode of operation, shown in FIG. 4, the structure of the motor 10 remains unaltered and there are no changes in the electrical connections. However, the stator 16 has been displaced 90 degrees, bringing the lug 26 into contact with the second stop 29. The pole positions of the magnets 31 are precisely the opposite of that shown in FIG. 4, since the angular displacement of the stator is equal to the angular difference between adjacent pole positions. Thus, the relationship between the magnetic field orientation is reversed and the direction in which the rotor 16 turns is counterclockwise. The degree of angular displacement of the stator 14 required to change rotational direction is, of course, lower if more poles are used and higher if fewer poles are used.

To simplify the construction of the motor 10 relating to its necessary capability for angular movement of the stator 14, the home or rest position of the stator 16 (FIG. 2) under the bias of the springs 30, is not centered between its two stop-engaging positions (the center being indicated in FIGS. 2-4 by a line A—A). Instead, the home position is closer to the position of FIG. 3, corresponding to clockwise rotation. Clockwise rotation is, therefore, the preferred mode of operation. In other words, if the rotor winding 38 is energized without moving the stator 14 from its home position, clockwise rotation will commence because of the direction in which the magnetic field is off-center with respect to the commutator orientation. A reaction torque will tend to rotate the stator 16 in a counterclockwise direction until the lug 26 engages the first stop 28.

If it is desired to rotate the rotor 16 in a counterclockwise direction, starting with the stator 14 in its home position, a solenoid 46 is actuated, causing the stator 14 to move slightly past the center position (as shown in phantom lines in FIG. 2). This partial movement is sufficient since the reaction torque will move the lug 26 into engagement with the proper stop 29 (FIG. 4). The poles of the magnets 32 are oppositely positioned with respect to the orientation of the commutator 40 and the direction of current flow in the segments of the winding 38 when compared to the orientation of the stator in FIG. 3.

The preferred direction of rotation should be chosen with regard to the function of the motor 10 so that movement in the more critical direction is always possible without operation of the solenoid 46. In a hoist, for example, the preferred direction of rotation would raise the load.

Figure 5:
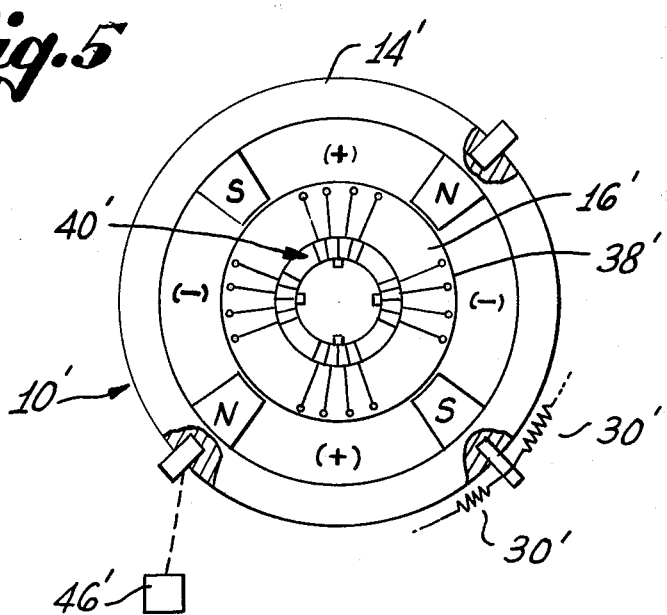
FIG. 5 is still another view similar to FIG. 2 but showing a second embodiment of the invention in a rest position.

A motor 10' of alternative construction (shown in FIG. 5) has no preferred direction of rotation. Instead, the home position of the stator 14, as determined by the springs 30', is centered, being on the line A'—A'. If the rotor winding 38' is energized while in this neutral position, it will remain stationary since the relationship between the orientations of the magnetic field of the stator 14' and the commutator 40' is such that the electromagnetic field applied to each segment of the winding is balanced by the electromagnetic field of another segment. A solenoid 46' is arranged to move the stator 16' in either direction, depending upon the direction of rotation desired.

It will be understood from the description above that the present invention uniquely provides for a highly reliable, reversible, electric motor of unusual simplicity. No electrical switching is required to change direction. Moreover, the components of the magnetic circuit remain stationary with respect to each other and there are no added losses in the magnetic circuit attributable to its movability. While the invention has been illustrated and explained with respect to a motor, the same principles can be applied to generators.

While a particular form of the invention has been illustrated and described, it will be apparent that various modifications can be made without departing from the spirit and scope of the invention.

I claim:

1. A direct current, rotary, electromagnetic, energy conversion machine comprising:

a base;

a stator supported by said base that is movable between angularly displaced first and second positions corresponding to first and second rotational modes of operation of said machine, said stator remaining stationary during continuous operation of said machine in either mode;

at least one magnet connected to said stator to establish a magnetic field orientation of said stator defined by angularly separated north and south poles disposed thereabout, said magnet being rotatably movable with said stator to change the orientation of said field, said first and second positions being so related to each other that the respective positions of said north and south poles are interchanged upon movement of said stator between said positions;

a rotor having a segmented winding thereon supported by said base and rotatable within said stator to interact electromagnetically with said magnets; and commutator means having a predetermined orientation for determining the direction of current flow through segments of said winding in accordance with the positions of said segments, said commutator and stator orientations being oppositely related to each other depending upon whether said stator occupies said first or second position.

2. The machine of claim 1 wherein said first and second stator positions are angularly displaced from each other by the separation of said poles.

3. The machine of claim 1 wherein said magnet is a permanent magnet.

4. The machine of claim 1 wherein said machine is a motor.

5. The machine of claim 1 further comprising stop means for arresting movement of said stator in one of said stator positions.

6. The machine of claim 1 further comprising means for moving said stator partially toward a position in which it engages said stop means, whereby said stator is allowed to complete its movement toward said stop means under reaction torque upon energization of said winding.

7. The machine of claim 1 further comprising means for biasing said stator toward a home position that is off-center with respect to said commutator orientation, whereby said machine has a preferred direction of rotation of said rotor.

8. The machine of claim 7 further comprising means for moving said stator from said home position past a position that is centered with respect to said commutator orientation to effect rotation of said rotor in a direction opposite said preferred position.

9. The machine of claim 7 further comprising:

stop means for arresting movement of said stator in said first and second positions; and means for moving said stator from said home position past a position that is centered with respect to said commutator orientation and partially toward a position in which it engages said stop means, whereby said stator is allowed to complete its movement toward said stop means under reaction torque upon energization of said winding.

10. A reversible, direct current, electric motor comprising:

a base;

a stator supported by said base that is rotatable between angularly separated first and second positions;

at least one permanent magnet mounted on said stator to establish a magnetic field orientation and rotatably movable with said stator to change the orientation of said field, said magnet having north and south poles with a predetermined angular separation equal to the separation of said first and second positions;

a rotor rotatable about the same axis as said stator, supported by said base, and rotatable within said stator, said rotor having a segmented winding thereon to interact electromagnetically with said magnet upon energization thereof; and commutator means having a predetermined orientation associated with said winding for determining the direction of current flow through segments of said winding in accordance with the positions of said segments, said commutator and stator orientation being oppositely related to each other to produce either clockwise or counter-clockwise rotation of said rotor depending upon whether said stator occupies said first or said second position.

11. The machine of claim 10 further comprising means for moving said stator partially toward a position in which it engages said stop means whereby said stator is allowed to complete its movement toward said stop means under reaction torque upon energization of said winding.

12. The machine of claim 10 further comprising means for biasing said stator toward a home position that is off-center with respect to said commutator orientation, whereby said machine has a preferred direction of rotation of said rotor.

13. The machine of claim 12 further comprising means for moving said stator from said home position past a position that is centered with respect to said commutator to effect rotation of said rotor in a direction opposite said preferred position.

14. A reversible, direct current, electric motor comprising:

a base;

a stator supported by said base that is rotatable between angularly displaced first and second positions;

at least one permanent magnet mounted on said stator to establish a magnetic field orientation and rotatably movable with said stator to change the orientation of said field, said magnet having north and south poles with a predetermined angular displacement;

a rotor having a segmented winding thereon supported by said base and rotatable within said stator to interact electromagnetically with said magnet upon energization thereof;

commutator means having a predetermined orientation associated with said winding for determining the direction of current flow through segments of said winding in accordance with the positions of said segments, said commutator and stator orientations being oppositely related to each other to produce either clockwise or counter-clockwise rotation of said rotor depending upon whether said stator occupies said first or said second position;

stop means for arresting movement of said stator in said first and second positions;

resilient means for biasing said stator toward a position that is off-center with respect to said commutator orientation, whereby said motor has a preferred direction of rotation of said rotor;

means for moving said stator from said home position past a position that is centered with respect to said commutator orientation and partially toward a position in which it engages said stop means, whereby said stator is allowed to complete its movement toward said stop means under reaction torque upon energization of said winding.

* * * * *